United States Patent Office 3,506,654
Patented Apr. 14, 1970

3,506,654
BENZYLIDENE DERIVATIVES OF CHROMENE, THIOCHROMENE, QUINOLINE, AND N-ALKYL QUINOLINE AND CORRESPONDING BENZYL TERTIARY CARBINOL INTERMEDIATES
John H. Fried, Palo Alto, Calif., assignor to Syntex Corporation, Panama, Panama, a corporation of Panama
No Drawing. Filed Sept. 15, 1966, Ser. No. 579,478
Int. Cl. C07d 7/34, 33/52, 65/14
U.S. Cl. 260—240                         19 Claims

ABSTRACT OF THE DISCLOSURE

This discloses as new compounds benzylidene derivatives of chromene, thiochromene, quinoline and N-alkyl quinoline and derivatives thereof wherein the benzylidene moiety is optionally substituted with hydroxy loweralkoxy, cycloalkoxy, 2-dialkylaminoethoxy, 2-piperidinoethoxy, 2-pyrrolidinoethoxy 2-morpholinoethoxy or tetrahydropyran-2′-yloxy and wherein the chromene, thiochromene, quinoline and N-alkylquinoline rings are also optionally substituted. These compounds are useful in accordance with their estrogenic and anti-estrogenic activities. Also taught are methods for the preparation of these compounds and the corresponding intermediate benzyl tertiary carbinols useful in these preparations.

The present invention relates to novel compounds possessing pharmacological properties associated with steroidal hormonal agents and novel intermediates in the production thereof. The new non-steroidal hormonal agents are benzylidene derivatives of heterocyclic compounds containing two fused rings. More particularly, these agents are benzylidene and p-substituted benzylidene derivatives of chromene, thiochromene, quinoline and N-alkyl quinoline. The compounds of the present invention are represented by the following formula:

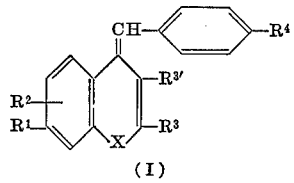

(I)

wherein $R^1$ is hydrogen, hydroxy, lower alkoxy, cycloalkoxy, 2-dialkylaminoethoxy, 2-piperidinoethoxy, 2-pyrrolidinoethoxy, 2 - morpholinoethoxy or tetrahydropyran - 2′-yloxy;

$R^2$ is hydrogen, lower alkyl or chloro;

Each of $R^3$ and $R^{3'}$ independently is hydrogen or lower alkyl;

$R^4$ is hydrogen, hydroxy, lower alkoxy, cycloalkoxy, 2-dialkylaminoethoxy, 2-piperidinoethoxy, 2-pyrrolidinoethoxy, 2-morpholinoethoxy or tetrahydropyran-2′-yloxy; and X is an oxygen atom, a sulfur atom, an imino group or a lower alkyl substituted imino group.

By the term lower alkoxy is meant a straight chain carbon atom group containing from 1 to 4 carbon atoms, inclusive, such as methoxy, ethoxy, propoxy and butoxy.

By the term lower alkyl is meant a straight chain carbon atom group containing from 1 to 4 carbon atoms, inclusive, such as methyl, ethyl, propyl and butyl.

By the term cycloalkoxy is meant a saturated ring carbon group containing 5 or 6 carbon atoms, such as cyclopentyloxy and cyclohexyloxy. By the term alkyl in 2-dialkylaminoethoxy is meant a straight chain carbon atom group containing from 1 to 4 carbon atoms inclusive. Thus, 2-dialkylaminoethoxy includes 2-dimethylaminoethoxy, 2 - diethylaminoethoxy, 2 - dipropylaminoethoxy and 2-dibutylaminoethoxy.

The novel compounds of Formula I demonstrate estrogenic and anti-estrogenic activities. Those compounds of Formula I, wherein either $R^1$, $R^4$ or both $R^1$ and $R^4$ is 2-dialkylaminoethoxy, 2-pyrrolidinoethoxy, 2-piperidinoethoxy of 2-morpholinoethoxy, have pronounced anti-estrogenic activity and are useful as anti-fertility agents, for lowering blood cholesterol levels and for inhibiting steroidal biosynthesis. Those compounds of Formula I, wherein either $R^1$, $R^4$ or both $R^1$ and $R^4$ is hydrogen, hydroxy, lower alkoxy, cycloalkoxy, or tetrahydropyran-2′-yloxy, have estrogenic activity and are useful in causing weight gains in animals and in treating uterine disorders. The novel hormonal agents of the present invention are administered via usual routes, i.e. orally or parenterally in pharamaceutically acceptable compositions at dosage rates of from 0.5γ to 5 mg./kg./day. However, dosage rates below or above this range can also be used; the most favorable dosage rate and administration route being conditioned upon the purpose for which it is administered and the response thereto.

The novel compounds of the present invention are prepared by the following process:

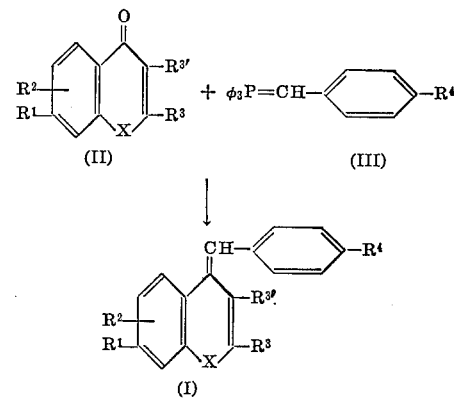

wherein all substituents are as previously defined hereinabove.

In carrying out the process, a chromone, thiochromone, 4-(1H)-quinolone or N-alkyl-4-(1H)-quinolone of Formula II is reacted with a Wittig reagent of Formula III in the absence of a solvent at about 250° C. to afford the novel hormonal agents represented by Formula I of the present invention. Alternatively, the chromone, thiochromone, 4-(1H)-quinolone or N-alkyl-4-(1H)-quinolone of Formula II and the Wittig reagent of Formula III are refluxed in a high boiling, inert organic solvent, such as xylene, diphenyl ether, diethyleneglycol dimethyl ether, triethyleneglycol dimethyl ether or the like, preferably xylene, for a period of about twenty-four hours to afford the novel compounds of Formula I.

Alternatively, the $R^1$ and $R^4$ substituents, in a compound of Formula I, as lower alkoxy, cycloalkoxy, 2-dialkylaminoethoxy, 2 - piperidinoethoxy, 2 - pyrrolodinoethoxy, 2-morpholinoethoxy or tetrahydropyran-2′-yloxy, are introduced subsequent to the above reaction of the present invention via conventional techniques by treating the corresponding compound of Formula I, wherein $R^1$ and/or $R^4$ are hydroxy, with an appropriate reagent. For example, a lower alkoxy or cycloalkoxy substituent is introduced by treatment of the hydroxy compound with sodium or potassium carbonate in acetone followed by the addition of the alkoxy or cycloalkoxy halide, preferably the chloride. A 2-dialkylaminoethoxy, 2-piperidinoethoxy, 2-pyrrolidinoethoxy or a 2-morpholinoethoxy substituent is introduced by treatment of the hydroxy compound with a β-chloroethylamine in methanol containing sodium methoxide. Thus, the alkylation of the hydroxy compound is effected by treating the sodium salt with β-chloroethyldialkylamine, β-chloroethylpiperidine, β-chloroethylpyrrolidine, or β-chloroethylmorpholine, respectively. The tetrahydropyran-2-yloxy substituent is introduced by treating a corresponding hydroxy compound with dihydropyran in the presence of an inert solvent, such as p-toluenesulfonic acid or p-toluenesulfonyl chloride in an inert solvent, such as benzene.

Alternatively, the novel compounds of the present invention are prepared by the following process:

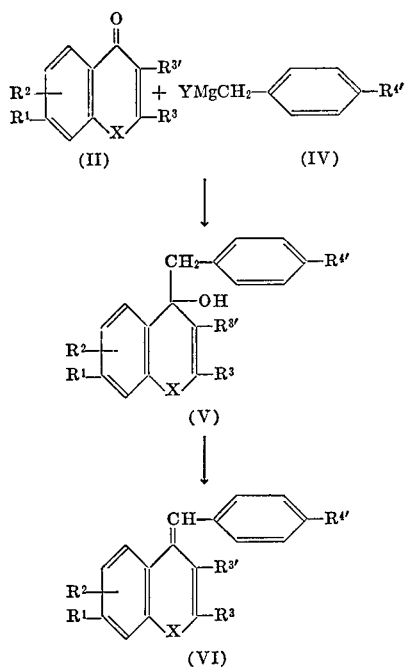

wherein Y is chloro or bromo;

R⁴′ is hydrogen, lower alkoxy, cycloalkoxy, 2-dialkylaminoethoxy, 2-piperidinoethoxy, 2-pyrrolidinoethoxy; 2-morpholinoethoxy or tetrahydropyran-2′-yloxy; and All other substituents are as previously defined.

In carrying out the alternate process, a chromone, thiochromone, 4-(1H)-quinolone or N-alkyl-4-(1H)-quinolone of Formula II is reacted with a Grignard reagent of Formula IV in an inert, anhydrous solvent such as tetrahydrofuran, diethyl ether or the like, to afford a novel tertiary carbinol intermediate of Formula V. The carbinol intermediate of Formula V is then dehydrated by treatment with thionyl chloride in pyridine at room temperature for a period of about one hour to afford the novel compounds of Formula VI of the present invention.

Alternatively, the R¹ substituent, in a compound of Formula VI, as lower alkoxy, cycloalkoxy, 2-dialkylaminoethoxy, 2-piperidinoethoxy, 2-pyrrolidinoethoxy, 2-morpholinoethoxy, or tetrahydropyran-2′-yloxy, is introduced subsequent to the above process of the present invention via conventional techniques by treating the corresponding compound of Formula VI, wherein R¹ is hydroxy with an appropriate reagent as described hereinabove.

Illustrative of the starting materials for the process of this invention are the following chromones, thiochromones, 4-(1H)-quinolones and N-alkyl-4-(1H)-quinolones, namely,

CHROMONES 7-butoxy-2-methylchromone;
6-chloro-2,3-dimethylchromone;
6-chloro-2-methylchromone;
7-(2-diethylaminoethoxy)-2-methylchromone;
7-(2-dimethylaminoethoxy)-2-methylchromone;
2,3-dimethylchromone;
2,6-dimethylchromone;
2-ethylchromone;
7-ethoxychromone;
7-hydroxychromone;
7-hydroxy-2,3-diethylchromone;
7-hydroxy-2,3-dimethylchromone;
7-hydroxy-2,6-dimethylchromone;
7-hydroxy-2,8-dimethylchromone;
7-hydroxy-2-methyl-3-propylchromone;
7-hydroxy-2-methyl-6-propylchromone;
7-hydroxy-2-methylchromone;
7-hydroxy-3-methylchromone-7-propoxy-2-methylchromone;
2-methylchromone;
3-methylchromone;
6-methylchromone;
7-methoxychromone;
2,3-diethyl-7-methoxychromone;
7-methoxy-2-methylchromone;
7-methoxy-2,3,8-trimethylchromone;
7-methoxy-2,3-dimethylchromone;
7-methoxy-2,8-dimethylchromone;
7-methoxy-2,6-dimethylchromone;
7-methoxy-2-methyl-6-propylchromone;
7-methoxy-2-methyl-8-propylchromone;
7-methoxy-2-propylchromone; and
2,5,8-trimethylchromone.

THIOCHROMONES 7-hydroxythiochromone;
7-methoxythiochromone;
5-chloro-2,8-dimethylthiochromone;
2,6-dimethylthiochromone;
2,8-dimethylthiochromone;
3,6-dimethylthiochromone;
3,8-dimethylthiochromone;
2-methylthiochromone;
6-chloro-2-methylthiochromone;
8-chloro-2-methylthiochromone;
3-methylthiochromone; and
8-methylthiochromone.

Additional thiochromones are prepared by cyclization with polyphosphoric acid of the chloride of the corresponding β-aryl-mercaptoacrylic acids, [as described by Montanari, F. and Negrini, A., La Ricera Scientivica, 27, 3055–3059 (1957)].

4-(1H)-QUINOLONES AND N-ALKYL ANALOGS 6-chloro-1-ethyl-2,3-dimethyl-4-(1H)-quinolone;
6-chloro-1-ethyl-3-methyl-4-(1H)-quinolone;
7-hydroxy-4-(1H)-quinolone;
7-methoxy-4-(1H)-quinolone;
1,2-dimethyl-4-(1H)-quinolone;
2,3-dimethyl-4-(1H)-quinolone;
1-ethyl-2-methyl-4-(1H)-quinolone;
3-ethyl-2-methyl-4-(1H)-quinolone;
1-methyl-4-(1H)-quinolone;
2-propyl-4-(1H)-quinolone; and
1,2,3-trimethyl-4-(1H)-quinolone.

Additional 4-(1H)-quinolones are prepared by dehydrogenation of the corresponding 4-oxo-1,2,3,4-tetrahydroquinoline, the latter being obtained by the cyclization of the appropriate N-aryl-N-tosyl-2-aminopropionic acid followed by hydrolytic removal of the protecting tosyl group [as described by Speckam, W. N., et al., Recueil, 82, 39–48 (1963)]. The dehydrogenation is achieved by refluxing a 4-oxo-1,2,3,4-tetrahydroquinoline with 2,3-dichloro-5,6-dicyanobenzoquinone in an inert organic solvent, such as dioxane for a period of about ten hours. In an alternate procedure, the dehydrogenation is achieved by treating the 4-oxo-1,2,3,4-tetrahydroquinoline with first mercuric acetate in an inert organic solvent, preferably dioxane, for a period of six hours, at the reflux temperature of the solvent, and second with a solution of potassium t-butoxide in t-butanol at room temperature for a period of about six hours.

The starting materials of Formula II, wherein $R^1$ is lower alkoxy or cycloalkoxy, are prepared from a corresponding hydroxy compound, i.e. Formula II, wherein $R^1$ is hydroxy, by the alkylation procedure as described hereinabove. The starting materials of Formula II, wherein $R^1$ is 2-dialkylaminoethoxy, 2-piperidinoethoxy 2 - pyrrolidinoethoxy or 2- morpholineoethoxy, are prepared from a corresponding hydroxy compound, i.e. Formula II, wherein $R^1$ is hydroxy, by an alkylation procedure as described hereinabove. The starting materials of Formula II, wherein $R^1$ is tetrahydropyran-2'-yloxy are prepared from a corresponding hyddoxy compound as described hereinabove by treatment with dihydropyran in the presence of an acid catalyst, such as p-toluenesulfonic acid or p-toluenesulfonyl chloride, in an inert solvent, such as benzene.

The Wittig reagents of Formula III are prepared according to conventional procedures, such as [Trippett, S., Advances in Organic Chemistry, vol. I., pp. 83–102; Trippett, S., Quarterly Reviews, vols. 16–17, pp. 406–440 (1962–1963), and Greenwald, R., Chaykovsky, M., and Corey, E. J., J. Org. Chem., 28, 1128–1129 (1963)]. Similarly, the Grignard reagents of Formula IV are prepared via conventional procedures known to those skilled in the art.

The following examples serve to illustrate but are not intended to limit the scope of the present invention.

PREPARATION A p-Bromomethylphenol

To 15 ml. of glacial acetic acid is added 4.7 g. of phenol and 3.5 g. of paraformaldehyde. The mixture is cooled to 0° C. and anhydrous hydrogen bromide is passed into the reaction mixture until the solution is saturated. During the addition, heat is evolved, and the rate is controlled so that the temperature of the mixture does not exceed 80° C. Near the saturation point, the suspended paraformaldehyde disappears and a clear solution results. The saturated solution is cooled and the reaction product precipitates from solution. The solid product is filtered and recrystallized from heptane to yield p-bromomethylphenol.

PREPARATION B

Ether preparation

To a solution of 4.7 g. of phenol in 100 ml. of ethanol is added 22.4 g. of 25% sodium methoxide in methanol. After 10 minutes, 16.1 g. of N-(2-chloroethyl)-piperidine (obtained by neutralization of the corresponding hydrochloride) in 100 ml. of ethanol is added to the mixture. The mixture is refluxed for a period of 16 hours, cooled and filtered. The filtrate is concentrated in vacuo, taken up in ether and washed with water. After removing the ether, the residue is distilled through a short Vigreux column to yield phenyl 2-piperidinoethyl ether.

Utilizing the above procedure with one exception, namely substituting an equivalent amount of:

N-(2-chloroethyl)-pyrrolidine;
N-(2-chloroethyl)-morpholine; and
1-diethylamino-2-chloroethane;

for the above N-(2-chloroethyl)-piperidine, there are obtained the corresponding:

Phenyl 2-pyrrolidinoethyl ether;
Phenyl 2-morpholinoethyl ether; and
Phenyl 2-diethylaminoethyl ether; respectively.

The above 1-diethylamino-2-chloroethane is prepared according to the procedure of Breslow, et al., J. Am. Chem. Soc., 67, 1472 (1945).

PREPARATION C

Bromo and chloromtehylation procedures

To 15 ml. of glacial acetic acid is added 4.7 g. of anisole and 3.5 g. of paraformaldehyde. The mixture is cooled to 0° C. and anhydrous hydrogen bromide is passed into the reaction mixture until the solution is saturated. During the addition, heat is evolved and the rate is controlled so that the temperature of the mixture does not exceed 80° C. Near the saturation point, the suspended paraformaldehyde disappears and a clear solution results. The saturated solution is cooled and the reaction product precipitaes from solution. The solid product is filtered and recrystallized from heptane to yield p-bromomethylanisole.

Utilizing the same procedure with one exception namely replacing anisole with each of the following ethers, namely:

Phenyl cyclopentyl ether;
Phenyl diethylaminoethyl ether;
Phenyl morpholinoethyl ether; and
Phenyl piperidinoethyl ether;

there are obtained the corresponding p-bromomethyl compounds, namely:

p-Bromomethylphenyl cyclopentyl ether;
p-Bromomethylphenyl-2-diethylaminoethyl ether;
p-Bromomethylphenyl 2-morpholinoethyl ether; and
p-Bromomethylphenyl 2-piperidinoethyl ether, respectively.

Utilizing the same procedure with one exception, namely substituting hydrogen chloride for hydrogen bromide in the above method, there are obtained the corresponding p-chloromethyl phenyl ethers.

PREPARATION D 2-dialkylaminomethoxy and 2-piperidinoethoxy starting materials

A solution of 3 g. of 7-hydroxychromone and 2 g. of potassium carbonate in 50 ml. of acetone is added 2 g. of 1-diethylamino-2-chloroethane [prepared according to the procedure of Breslow et al., J. Am. Chem. Soc., 67, 1472 (1945)]. The reaction mixture is heated at reflux for a period of 24 hours, cooled, filtered and the filtrate is evaporated to dryness. The residue is recrystallized from ethyl acetate:benzene to yield 7-(2-diethylaminoethoxy)-chromone.

Using the same procedure, the following starting materials are reacted with the following chloro compounds to afford the indicated final products:

| Starting Material | Chloro Compound | Final Products |
| --- | --- | --- |
| 7-hydroxychromone | 2-piperidine ethyl | 7-(2-piperidinoethoxy) 4-chromone. |
| 7-hydroxythiochromone. | 1-dibutylamino-2-chloropropane. | 7-dibutylaminoethoxy-4-thiochromone. |
| 7-hydroxy-1-methyl-quinolone. | do | 7-dibutylamincethoxy-1-methyl-4-quinolone. |
| 7-hydroxy-1-propyl-quinolone. | 1-dimethylamino-2-chloropropane. | 7-dimethylaminoethoxy 1-propyl-4-quinolone. |

PREPARATION E 7-methoxy-4-(1H)-quinolones

A mixture of 0.5 g. of 1-methyl-7-methoxy-4-oxo-1,2,3,4-tetrahydroquinoline, 10 ml. of dioxane and 0.35 g. of 2,3-dichloro-5,6-dicyano-1,4-benzoquinone is refluxed for ten hours. The mixture is then cooled, filtered and evaporated to dryness. The residue is dissolved in acetone and this solution is then filtered through 10 g. of alumina and concentrated to yield 1-methyl-7-methoxy-4-(1H)-quinolone which is further purified by recrystallization from acetone:hexane.

Utilizing the above procedure, 1-ethyl-7-methoxy-4-oxo-1,2,3,4-tetrahydroquinoline; and
1-n-butyl-7-methoxy-4-oxo,1,2,3,4-tetrahydroquinoline;

[prepared according to the procedure of Speckam W. N., et al., Recueil, 82, pages 39–48 (1963)] are converted to the corresponding 4-(1H)-quinolones, namely:

1-ethyl-7-methoxy-4-(1H)-quinolone; and
1-n-butyl-7-methoxy-4-(1H)-quinolone; respectively.

PREPARATION F 7-methoxy-4-(1H)-quinolones

A mixture of 1 g. of 1-methyl-7-methoxy-4-oxo-1,2,3,4-tetrahydroquinoline, 10 ml. of dioxane and 0.5 g. of mercuric acetate are heated at reflux for a period of six hours. The mixture is then cooled, filtered and evaporated to dryness. The residue is treated with one molar equivalent of potassium t-butoxide in 20 ml. of t-butanol under an inert atmosphere of nitrogen and allowed to stand for a period of six hours. The pH is adjusted to neutral and the mixture partitioned between chloroform and water. The chloroform solution is dried and concentrated to yield 1-methyl-7-methoxy-4-(1H) - quinolone which is further purified by recrystallization from petroleum ether:acetone.

In a similar fashion, 7-methoxy-4-oxo-1,2,3,4-tetrahydroquinoline is converted to 7-methoxy-4-(1H)-quinolone.

PREPARATION G 7-hydroxythiochromone

A mixture of 1 g. of p-mercaptophenol, 1 g. of propiolic acid, and 0.6 g. of potassium hydroxide in 25 ml. of water is heated at 90° C. for a period of two hours. The mixture is then evaporated to dryness and refluxed with 3 ml. of thionyl chloride until the evolution of hydrochloric acid ceases. The excess thionyl chloride is removed by evaporation under reduced pressure. The residue is mixed with 5 ml. of polyphosphoric acid, heated at 120–140° C. for a period of five minutes and then poured into water. The aqueous phase is extracted with ether and the ether extract is washed, dried and evaporated to yield 7-hydroxythiochromone which is recrystallized from petroleum ether:acetone.

EXAMPLE 1

4-(benzylidene) analogs

To a solution of 10 g. of triphenylphosphine in 50 ml. of benzene is added 9 g. of benzylbromide. The reaction mixture is allowed to stand at room temperature for two hours and the solid material is filtered and washed with benzene to yield benzyltriphenylphosphonium bromide. A mixture of 4 g. of the benzyltriphenylphosphonium bromide and 1 g. of phenyllithium in 40 ml. of anhydrous tetrahydrofuran is allowed to stand at 25° C. for a period of three hours. The tetrahydrofuran is removed by evaporation under reduced pressure and replaced with 40 ml. of xylene. To this mixture is added 3 g. of 7-ethoxy-4-chromone and the reaction mixture is heated at reflux for 24 hours, then cooled and reduced to dryness under reduced pressure. The residue is washed with water, extracted with ether; the extract is dried and evaporated to dryness to yield 7-ethoxy-4-(benzylidene)-chromene which is recrystallized from ethyl acetate:petroleum ether.

Utilizing the above procedure, the following starting materials, namely:

7-butoxy-2-methylchromone;
7-(2-diethylaminoethoxy)-2-methylchromone;
7-methoxythiochromone;
7-hydroxychromone;
1-methyl-7-methoxy-4-(1H)-quinolone;
7-methoxy-2,8-dimethylchromone; and
7-methoxy-2-propylchromone;

are converted to the corresponding 4-(benzylidene) analogs, namely:

7-butoxy-2-methyl-4-benzylidenechromene;
7-(2-diethylaminoethoxy)-2-methyl-4-benzylidenechromene;
7-methoxy-4-benzylidenethiochromene;
7-hydroxy-4-benzylidenechromene;
1-methyl-7-methoxy-4'-benzylidene-4-(1H)-quinoline;
7-methoxy-2,8-dimethyl-4-benzylidenechromene; and
7-methoxy-2-propyl-4-benzylidenechromene.

EXAMPLE 2

4-(p-hydroxybenzylidene) analogs

To a solution of 10 g. of triphenylphosphine in 50 ml. of benzene is added 10 g. of p-bromomethylphenol. The reaction mixture is allowed to stand at room temperature for two hours and the solid material is filtered and washed with benzene to yield p-hydroxybenzyltriphenylphosphonium bromide. A mixture of 4 g. of the p-hydroxybenzyltriphenylphosphonium bromide and 3 g. of sodium ethoxide in 40 ml. of dimethylformamide is allowed to stand for three hours. The dimethylformamide is removed by evaporation under pressure and replaced with 40 ml. of xylene. To this mixture is added 1.5 g. of 7-hydroxychromone and the reaction mixture is heated at reflux for 24 hours, then cooled and reduced to dryness under reduced pressure. The residue is washed with water, extracted with ether; the extract is dried and evaporated to dryness to yield 4 - (p - hydroxybenzylidene) - 7 - hydroxychromene which is recrystallized from ethyl acetate:petroleum ether.

Utilizing the same procedure, the following starting materials, namely:

7-hydroxythiochromone;
7-hydroxy-4-(1H)-quinolone; and
1-methyl-7-hydroxy-4-(1H)-quinolone;

are converted to the final products, namely:

4-(p-hydroxybenzylidene)-7-hydroxythiochromene;
4-(p-hydroxybenzylidene)-7-hydroxy-4-(1H)-quinoline; and
1-methyl-4-(p-hydroxybenzylidene)-7-hydroxy-4-(1H)-quinoline.

EXAMPLE 3

2-dialkylaminoethoxy and 2-pyrrolidinoethoxy-benzylidene analogs

To a solution of 3 g. of 7-methoxy-4-(p-hydroxybenzylidene)-chromene and 2 g. of potassium carbonate in 50 ml. of acetone is added 2 g. of 1-dimethylamino-2-chloroethane [prepared according to the procedure of Breslow et al., J. of Am. Chem. Soc., 67, 1472 (1945)]. The reaction mixture is heated at reflux for a period of 24 hours, cooled and evaporated to dryness. The residue is recrystallized from ethyl acetate:benzene to yield 7-methoxy - 4 - [p - (2 - dimethylaminoethoxy) - benzylidene]-chromene.

Utilizing the same procedure with one exception, namely substituting a molar equivalent, each of the following amines [prepared according to the procedure of Breslow et al., J. of Am. Chem. Soc., 67, 1472 (1945)], namely:

1-diethylamino-2-chloroethane; and
1-dibutylamino-2-chloroethane;

there are obtained the corresponding dialkylaminoethoxy final products, namely:

7-methoxy-4-[p-(2-diethylaminoethoxy)-benzylidene]-chromene; and
7-methoxy-4-[p-(2-di-n-butylaminoethoxy)-benzylidene]-chromene, respectively.

In a similar fashion, by using the same procedure and starting material and substituting β-chloroethylpyrrolidine for the above 1-diethylamino-2-chloroethane, there is obtained the corresponding 2-pyrrolidinoethoxy compound, namely:

7-methoxy-4-[p-(2-piperidinoethoxy)-benzylidene]-chromene.

Utilizing the above procedure, the following starting materials, namely:

7-methoxy-4-(p-hydroxybenzylidene)-thiochromone; and
1-methyl-7-methoxy-4'-(p-hydroxybenzylidene)-4-(1H)-quinolone;

are converted to the final products, namely:

7-methoxy-4-[p-(2-dimethylaminoethoxy)-benzylidene]-thiochromene; and
1-methyl-7-methoxy-4'-[p-(2-dimethylaminoethoxy)-benzylidene]-4-(1H)-quinoline, respectively.

EXAMPLE 4

Grignard preparation

A solution of 5 g. of 7-butoxy-4-chromone in 25 ml. of thiophenyl-free benzene is treated with an equimolar amount of benzylmagnesium bromide in anhydrous ether. The mixture is heated at reflux under anhydrous conditions for three hours, cooled and cautiously treated with an excess of aqueous ammonium chloride solution. This mixture is extracted with excess ammonium chloride solution. This mixture is then extracted with ethyl acetate and these extracts are in turn washed with water, dried over sodium sulfate and evaporated to dryness to yield 7-butoxy-4-(benzylidene)-chromene which is recrystallized from ethyl acetate:petroleum ether.

Using the above procedure, the following starting materials, namely:

7-methoxychromone;
7-methoxychromone; and
7-methoxy-1-methyl-4-(1H)-quinolone;

are converted to the corresponding 4-(benzylidene) final products, namely:

7-methoxy-4-(benzylidene)-chromene;
7-ethoxy-4-(benzylidene)-thiochromene; and
7-methoxy-1-methyl-4'-(benzylidene)-4-(1H)-quinoline.

EXAMPLE 5

Tetrahydropyran-2'-yl ethers

To a slurry of 1.0 g. of sodium hydride in 10 ml. of dry diethyleneglycol dimethyl ether under a dry nitrogen atmosphere is slowly added 1.0 g. of 7-hydroxy-4-(p-hydroxybenzylidene)-chromene in 10 ml. of dry diethyleneglycol dimethyl ether in a dropwise fashion over a 20 minute period. To this mixture is added dropwise, 0.9 g. of 2-chlorotetrahydropyran over a 10 minute period. The mixture is stirred at room temperature for an additional 30 minutes and then cautiously added to an ice-water mixture with stirring. The organic phase is extracted with diethyl ether, dried and evaporated under reduced pressure to yield 7-tetrahydropyran-2'-yloxy-4-[p-(tetrahydropyran-2'-yloxy)-benzylidene]-chromene which may be further purified via recrystallization from acetone:hexane.

Utilizing the same procedure, the following starting materials, namely:

7-methoxy-4-(p-hydroxybenzylidene)-chromene; and
7-hydroxy-4-(benzylidene)-chromene;

are converted to the corresponding tetrahydropyran-2'-yl ethers, namely:

7-methoxy-4-[p-(tetrahydropyran-2'-yloxy)-benzylidene]-chromene; and
7-tetrahydropyran-2'-yloxy-4-(benzylidene)-chromene, respectively.

EXAMPLE 6

Alkyl and cycloalkyl ethers

A solution of one equivalent of 7-hydroxy-4-(benzylidene)-chromene in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 7-cyclopentyloxy-4-(benzylidene)-chromene which is further purified upon recrystallization from pentane.

Utilizing the same procedure, the following starting materials, namely:

7-(2-diethylaminoethoxy)-2-methyl-4-(p-hydroxybenzylidene)-chromene; and
7-hydroxy-4-(p-hydroxybenzylidene)-chromene;

are converted to the corresponding cyclopentylethers, namely:

7-(2-diethylaminoethoxy)-2-methyl-4-[p-(cyclopentyloxy)-benzylidene]-chromene; and
7-cyclopentyloxy-4-[p-(cyclopentyloxy)-benzylidene]-chromene, respectively.

Utilizing the above procedure and starting materials but substituting a molar equivalent of methyl chloride for cyclopentyl bromide, there are obtained the corresponding methyl ethers of the present invention.

EXAMPLE 7

Wittig reaction—methylsulfinyl carbanion method

To a mixture of 1 g. of sodium hydride in 20 ml. of pentane under an inert atmosphere, is slowly added 50 ml. of dimethylsulfoxide and the reaction mixture is heated at 75–80° C. for 45 minutes and then cooled to afford a solution of methylsulfinyl carbanion. To this solution is added 17 g. of benzylidenetriphenylphosphonium bromide and 40 ml. of dimethylsulfoxide and the mixture is held at room temperature for 10 minutes. The solvent is then removed by evaporation under reduced pressure and is replaced with 40 ml. of xylene. To this mixture is added 8 g. of 7-methoxy-4-chromone and the resulting mixture is allowed to stir at room temperature for an additional 30 minutes. The reaction mixture is then poured into 50 ml. of ice water and extracted with ether. The organic phase is washed with water, dried and evaporated to dryness and recrystallized from ethyl acetate: petroleum ether to yield 7 - methoxy - 4 - (benzylidene)-chromene.

EXAMPLE 8

Bis ethers

A solution of one equivalent of 7-hydroxy-4-(p-hydroxybenzylidene)-chromene in 30 ml. of benzene is heated to reflux and about 2 ml. removed by distillation to eliminate moisture. The mixture is cooled to room temperature and two equivalents of sodium hydride are added, followed by the addition of two equivalents of methyl chloride in 10 ml. of benzene over a period of 20 minutes. The mixture is allowed to reflux for 20 hours after which time the precipitate of sodium bromide is removed by filtration and the organic phase dried and evaporated to yield 7 - methoxy - 4 - (p-methoxybenzylidene)-chromene which is further purified upon recrystallization from pentane.

Utilizing the above procedure, the following starting materials are alkylated with the indicated chloro compounds to afford the following final products:

| Starting Material | Chloro Compound | Final Product |
|---|---|---|
| 7-hydroxy-2-methyl-4-(p-hydroxybenzylidene)-chromene. | 1-dimethylamino-2-chloroethane. | 7-(2-dimethylaminoethoxy)-2-methyl-4-[p-(2-dimethylaminoethoxy)-benzylidene]-chromene. |
| 7-hydroxy-4-(p-hydroxybenzylidene)-chromene. | β-chloroethyl-Pyrrolidine. | 7-(2-pyrrolidinoethoxy)-4-[p-(2-pyrrolidinoethoxy)-benzylidene]-chromene. |

EXAMPLE 9

Bis piperidinoethoxy ethers

To a solution of 10 g. of triphenylphosphine in 50 ml. of benzene is added 10 g. of p-bromomethylphenyl-2-piperidinoethyl ether. The reaction mixture is allowed to stand at room temperature for two hours and the solid material is filtered and washed with benzene to yield p-(2 - piperidinoethoxy) - benzyltriphenylphosphonium bromide. A mixture of 4 g. of the latter phosphonium bromide and 1 g. of phenyl lithium in 40 ml. of anhydrous tetrahydrofuran is allowed to stand at 25° C. for a period of three hours. The tetrahydrofuran is removed by evaporation under reduced pressure and replaced with 40 ml. of xylene. To this mixture is added 7-(2-piperidinoethoxy)-4-chromone and the reaction mixture is heated at reflux for 24 hours, cooled and reduced to dryness under reduced pressure. The residue is washed with water, extracted with ether; the extract is dried and evaporated to dryness to yield 7-(2-piperidinoethoxy)-4-[p-(2-piperidinoethoxy)-benzylidene]-chromene. In a similar fashion, by substituting the following starting materials, namely:

7-(2-piperidinoethoxy)-4-thiochromone; and
7-(2-piperidinoethoxy)-4-(1H)-quinolone;

for the 7-(2-piperidinoethoxy)-4-chromone in the above procedure, there are obtained the corresponding bis-2-piperidinoethoxy compounds, namely:

7-(2-piperidinoethoxy)-4-[p-(2-piperidinoethoxy)-benzylidene]-thiochromene; and
7-(2-piperidinoethoxy)-4-[p-(2-piperidinoethoxy)-benzylidene]-4-(1H)-quinoline.

EXAMPLE 10

Bis 2-dialkylaminoethoxy ethers

To a solution of 10 g. of triphenylphosphine in 50 ml. of benzene is added 10 g. of p-bromomethylphenyl 2-dimethylaminoethyl ether. The reaction mixture is allowed to stand at room temperature for two hours and the solid material is filtered and washed with benzene to yield p-(2-dimethylamino)-benzyltriphenylphosphonium bromide. A mixture of 4 g. of the latter phosphonium bromide and 1 g. of phenyl lithium in 40 ml. of anhydrous tetrahydrofuran is allowed to stand at 25° C. for a period of three hours. The tetrahydrofuran is removed by evaporation under reduced pressure and replaced with 40 ml. of xylene. To this mixture is added 7,2-dimethylaminoethoxy-4-chromone and the reaction mixture is heated at reflux for 24 hours, cooled and reduced to dryness under reduced pressure. The residue is washed with water, extracted with ether; the extract is dried and evaporated to dryness to yield 7-(2-dimethylaminoethoxy) - 4 - [p-(2-dimethylaminoethoxy)-benzylidene]-chromene. In a similar fashion, by substituting the following starting materials, namely:

7-(2-dimethylaminoethoxy)-4-thiochromone; and
7-(2-dimethylaminoethoxy)-4-(1H)-quinolone;

for the 7-(2-dimethylaminoethoxy)-4-chromone in the above procedure, there are obtained the corresponding bis-2-dimethylaminoethoxy compounds, namely:

7-(2-dimethylaminoethoxy)-4-[p-(2-dimethylaminoethoxy)-4-benzylidene]-thiochromene; and
7-(2-dimethylaminoethoxy)-4-[p-(2-dimethylaminoethoxy)-benzylidene]-4-(1H)-quinoline.

What is claimed is:

1. A compound of the following formula:

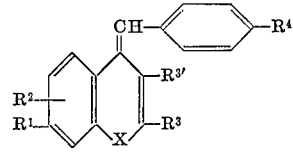

wherein $R^1$ is hydrogen, hydroxy, lower alkoxy, cyclopentyloxy, cyclohexyloxy, 2-dialkylaminoethoxy, 2-piperidinoethoxy, 2-pyrrolidinoethoxy, 2-morpholinoethoxy or tetrahydropyran-2′-yloxy;

$R^2$ is hydrogen, lower alkyl or chloro;

each of $R^3$ and $R^{3\prime}$ independently is hydrogen or lower alkyl;

$R^4$ is hydrogen, hydroxy, lower alkoxy, cyclopentyloxy, cyclohexyloxy, 2-dialkylaminoethoxy, 2-piperidinoethoxy, 2-pyrrolidinoethoxy, 2-morpholinoethoxy or tetrahydropyran-2′-yloxy; and X is an oxygen atom, a sulfur atom, an imino group or an n-(lower-alkyl)-imino group.

2. A compound according to claim 1 wherein each of $R^2$ and $R^{3\prime}$ is hydrogen; $R^3$ is hydrogen or methyl; and X is an oxygen atom.

3. A compound according to claim 2 wherein each of $R^1$ and $R^4$ is methoxy; and $R^3$ is hydrogen.

4. A compound according to claim 2 wherein $R^1$ is methoxy; $R^3$ is hydrogen; and $R^4$ is 2-dimethylaminoethoxy.

5. A compound according to claim 2 wherein $R^1$ is methoxy; $R^3$ is hydrogen; and $R^4$ is 2-pyrrolidinoethoxy.

6. A compound according to claim 2 wherein $R^1$ is 2-pyrrolidinoethoxy; $R^3$ is hydrogen; and $R^4$ is methoxy.

7. A compound according to claim 2 wherein $R^1$ is methoxy; $R^3$ is methyl; and $R^4$ is 2-pyrrolidinoethoxy.

8. A compound according to claim 1 wherein each of $R^2$ and $R^{3\prime}$ is hydrogen; $R^3$ is hydrogen or methyl; and X is a sulfur atom.

9. A compound according to claim 8 wherein each of $R^1$ and $R^4$ is methoxy; and $R^3$ is hydrogen.

10. A compound according to claim 8 wherein $R^1$ is methoxy; $R^3$ is hydrogen; and $R^4$ is 2-dimethylaminoethoxy.

11. A compound according to claim 8 wherein $R^1$ is methoxy; $R^3$ is hydrogen; and $R^4$ is 2-pyrrolidinoethoxy.

12. A compound according to claim 8 wherein $R^1$ is 2-pyrrolidinoethoxy; $R^3$ is hydrogen; and $R^4$ is methoxy.

13. A compound according to claim 8 wherein $R^1$ is methoxy; $R^3$ is methyl; and $R^4$ is 2-pyrrolidinoethoxy.

14. A compound according to claim 1 wherein each of $R^2$ and $R^{3\prime}$ is hydrogen; $R^3$ is hydrogen or methyl; and X is a methyl substituted imino group.

15. A compound according to claim 14 wherein each of $R^1$ and $R^4$ is methoxy; and $R^3$ is hydrogen.

16. A compound according to claim 14 wherein $R^1$ is methoxy; $R^3$ is hydrogen; and $R^4$ is 2-dimethylaminoethoxy.

17. A compound according to claim 14 wherein $R^1$ is methoxy; $R^3$ is hydrogen; and $R^4$ is 2-pyrrolidinoethoxy.

18. A compound according to claim 14 wherein $R^1$ is 2-pyrrolidinoethoxy; $R^3$ is hydrogen; and $R^4$ is methoxy.

19. A compound according to claim 14 wherein $R^1$ is methoxy; $R^3$ is methyl; and $R^4$ is 2-pyrrolidinoethoxy.

References Cited

Beilstein's Handbuch der Organischen Chemie, 4th ed., vol. 17, pp. 158 and 171–172 (system Nos. 2402 and 2410), Verlag Julius Springer, Berlin, Germany (1933).

Lowenbein et al., Annalen der Chemie, vol. 448, p. 233 (1926).

JOHN D. RANDOLPH, Primary Examiner

U.S. Cl. X.R.

260—247.1, 247.5, 247.7, 288, 294.7, 326.5, 327, 345.2, 999